United States Patent Office 3,025,646
Patented Mar. 20, 1962

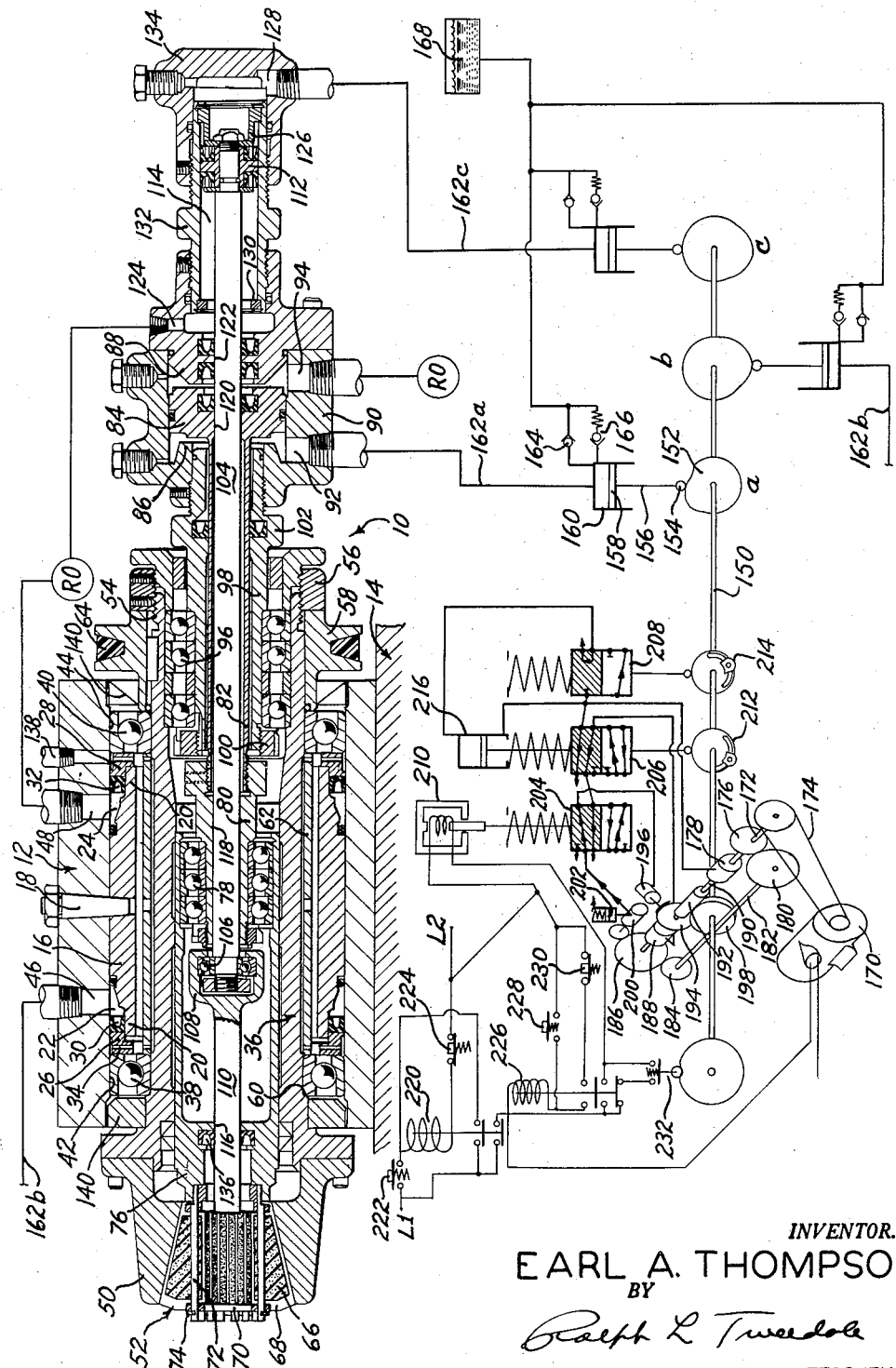

3,025,646
SPINDLE
Earl A. Thompson, 1300 Hilton Road, Ferndale 20, Mich.
Filed Nov. 30, 1960, Ser. No. 72,656
8 Claims. (Cl. 51—165)

This is a continuation-in-part of co-pending application Serial Number 744,750 filed June 26, 1958, now Patent 2,994,992 dated August 8, 1961, entitled "Radius Grinding Machine and Spindle" which in turn is a division of now forfeited application Serial Number 538,096 filed October 3, 1955, entitled "Hydraulic Control Mechanism." This invention relates to spindles for rotatably supporting a workpiece during a work operation.

In modern high precision mass production machine tools, one problem directly affecting the accuracy with which operations may be performed is chucking or gripping a work piece for rotation with a carefully controlled yet firm grip while maintaining extreme accuracy in the positioning of the part. When the gripping or chucking apparatus is made sufficiently strong, precision and accuracy are often sacrificed. And, when precision and accuracy are emphasized in the design, rapid wearing and consequent short and uneconomical life of the arrangement is encountered.

For instance, to prevent end play in a rotating chucking device, the rotary bearings are often thrust loaded. When the thrust load is made high enough for extreme accuracy, unnecessary wear is soon produced on the bearings. Furthermore, in prior devices the high bearing load is ordinarily wastefully maintained throughout a complete cycle of the machine even during the changeover period of the machine cycle when high precision is not required because the actual machining operation is not being performed.

Accordingly, it is an object of the present invention to provide an improved spindle and collet construction especially adapted to operate in an automatic manner to chuck, position and unload work pieces.

Another object of the invention is to provide a high precision spindle and collet which may be shifted axially in a manner which improves rather than detracts from the positioning accuracy of the spindle.

A further object is to provide an extremely simple concentric arrangement of an axially shiftable work spindle, mechanism for operating a collet, and apparatus for ejecting a work piece from the collet.

A further object is to provide a work supporting spindle having a hydraulic axial pre-load of one amount on the bearings during the non-work performing portions of the machine cycle and another axial load of a different amount on the bearings during the critical work performing portion of the cycle.

A further object is to provide a work spindle of the type described operated by means of a rotary cam powered and controlled mechanico-hydraulic power and control unit to obtain an accurately programmed sequence of movements of the various parts of the mechanism.

Further objects and advantages of the present invention will be apparent from the following detailed description read in conjunction with the accompanying drawing which shows in the upper portion a longitudinal sectional view of the spindle and collet of this invention and in the lower portion a schematic representation of the mechanico-hydraulic power and control unit utilized by the spindle of this invention.

In the upper portion of the FIGURE, the details of the spindle assembly 10 are shown. They may include a housing 12 secured to a table 14 which may exemplify any slide or bed portion of a modern high precision machine tool upon which the spindle may be incorporated. Within a longitudinal bore of the housing 12, there is arranged a sleeve 16 fastened within the housing by a wedge shaped key 18, and having axially extending cuffs 20 spaced radially inwardly to define with the interior of the housing front and rear annular chambers 22 and 24 in which are arranged axially shiftable annular pistons 26 and 28 respectively. An annular seal 30 is associated with the piston 26, and an annular seal 32 is associated with the piston 28; each of the pistons 26 and 28 has a series of radial ports 34 for directing lubricant between the inner and the outer periphery of the pistons.

Within housing 12 and extending through the sleeve 16, there is arranged an elongated collet driving spindle 36 which has anti-friction bearings 38 and 40 press fitted thereon so that the inner race of each bearing is in fixed spacial relation to the spindle tube 36. The outer race of bearing 38 is slidably arranged within the counterbore 42 of the housing 12, and the outer race of bearing 40 is slidably arranged within the counterbore 44 of the housing. The chamber in which piston 26 operates has an inlet port 46, and the chamber within which piston 28 shifts to and fro has an inlet port 48. The port 46 has conduit connected to the mechanico-hydraulic motivator in a manner later described in more detail, and port 48 connects by means of suitable piping with a constant biasing source of pressurized fluid, also better described further on.

At its outer or front end, spindle 36 removably supports a conical tapered nose piece 50 in which a correspondingly tapered annular collet 52 is arranged. At its rear end, spindle 36 has a threaded connection 54 for a nut 56 which locks a pulley 58 on the spindle in a manner which further aids in locking the bearings 38 and 40 by means of their inner races to the spindle through a loading shoulder 60 and an intermediate spacer sleeve 62. The pulley 58 may be rotated by a belt 64 from a prime mover such as an electric motor, not shown, mounted on the table 14.

Collet 52 has a rubber body portion 66 in which are imbedded a plurality of radially extending steel jaws 68 defining between their inner edges a work piece receiving bore. Around the front end of the collet, engaging the ends of the steel jaws, is a pull ring 70 having circumferentially spaced apertures through which a plurality of draw pins 72 extend. In front of the ring 70, a snap ring 74 positioned in slots in one side of each draw pin 72 provides a means for exerting a rearward push on the steel jaws 68 from their front end. The draw pins 72 extend through holes in the rubber body portion of the collet between successive jaws and are cut away and partially threaded at their rear end in a manner which provides a positive mechanical connection to an annular draw bar 76 and locks the pins against axial movement relative to the rest of the collet. In the arrangement shown, the work piece is in the nature of a cylindrical body member; the collet 52 is arranged to close and clamp a work piece securely when the collet is shifted rearwardly or to the right in the figure by means of the draw bar 76 acting through the draw pins 72, so as to be contracted by the tapered nose piece 50. A releasing of rearward pressure on the draw bar 76 allows the collet under the elastic pressure of the rubber body portion 66 to expand itself within the non-locking angle of the taper of the nose piece 50 to release the work piece.

The means for clamping and opening the collet are in the form of the draw bar 76 having a forward end secured by the aforementioned threads or other suitable means to the draw pins 72. At the rear end there is rotatably supported, as by bearings 78, a sleeve 80 threaded securely on the outer end of the hollow rod 82 of a piston 84. Piston 84 is shiftable to and fro through a short stroke limited by the forward and rear inturned flanges of heads 86, 88 respectively, of a cylinder 90 to either end of which hydraulic medium may be admitted through a forward port 92 and a rear port 94. Port 92 may be connected with the mechanico-hydraulic motivator, explained below, and port 94 may be connected with a constant biasing source of pressurized liquid, also explained below.

Cylinder 90 is supported for rotary movement only in the spindle 36 by bearings 96, the inner races of which are locked on a sleeve member 98 by means of a jam nut 100. An enlarged area 102 on the sleeve 98 may have either a knurled surface, an external hexagonal configuration, radially extending spanner wrench sockets, or other suitable means for handily rotating the sleeve 98 from outside the unit to adjust the axial position of the cylinder 90 in relation to the spindle 36. Thus, it will be obvious that rearward shifting of the piston 84 in the cylinder 90 by means of hydraulic medium introduced through the port 92 will effectively shift the blades or jaws 68 of the collet rearwardly so that the tapered portion will effect a collapsing of the collet with a resulting positive clamping action upon a work piece. Furthermore, it will be noted that the annular hollow draw bar 76 will rotate with the spindle 36 and the collet 52; whereas, the bearings 78 allow the sleeve 80 and the piston and piston rod 84 and 82, respectively, to partake only of desired axial motion.

Within the sleevelike draw bar 76 there is slidably arranged an operator bar or ejector bar 104 which is journalled at its front end in a bearing 106 supported within the cup shaped rear end 108 of a cylindrical ejector plunger 110. At the rear end of ejector bar 104, there is fixed a piston 112 which is slidably arranged in a cylinder 114. The ejector plunger 110 is supported for axial movement and against radial movement by a co-axial bore 116 in the center of the draw bar 76. Similarly, the ejector bar 104 is supported for axial sliding movement within a bore 118 concentrically arranged in the sleeve member 80 and also extends through the hollow piston rod 82 of piston 84 as well as through bores 120, 122 in the piston 84 and the rear head of the cylinder 90, respectively. Hydraulic fluid admitted to the cylinder 114 through a forward port 124 will move the piston 112 against a rear limit stop 126 fixedly associated with the cylinder wall and withdraw the ejector plunger 110 from the operative area of the collet 52. Hydraulic medium admitted to the rear end of the cylinder 114 through a port 128 will shift the piston 112 forward against a limit stop 130 associated with the forward end of the cylinder 114 and consequently shift the ejector plunger 110 forward through the work piece bore in the collet 52 to push a work piece from the collet. Conduits extending from the ports 124, 128 to a constant source of hydraulic biasing pressure and to the mechanico-hydraulic motivator, respectively, serve to shift the piston 112 to and fro as more fully described below.

Cylinder 114 is threaded in the rear head of the collet actuating cylinder 90 and also has an enlarged hexagonal, knurled or wrench socketed portion 132 by means of which the cylinder easily may be axially adjusted in relation to both the collet 52 and the spindle 36 without dismantling the entire unit. The rear head 134 of cylinder 114 also connects with the cylinder by suitable threads so that it need not be rotated when the cylinder is rotated for axial adjustment by means of the wrench portion 132.

Suitable packings 136 around the ejector plunger 110 in the bore 116 serve to exclude grit, water and other contaminants from the internal mechanisms within the hollow draw bar 76. Similarly, other oil seal packings in the rearward piston and cylinder assemblies serve to impede leakage of oil from its proper chamber to another chamber where it is not desired. Lubricant in any desired form such as a pressurized oil-mist may be admitted through a connection 138 between the housing 12 and the spindle 36 to lubricate the annular pistons 26 and 28 as well as the bearings 38 and 40. Seals 140, which may be of any type, such as felt wipers, serve to keep grit out from the between the spindle and the housing yet allow slight leakage of oil from within the spindle assembly to prevent dirt from accumulating within the spindle.

For shifting the spindle 36 axially to and fro with a limited stroke within the housing 12, for opening and closing the collet 52, and for operating the ejector plunger 110, the three double acting fluid motor arrangements of the above described spindle may be operated through a programmed sequence of movement to obtain utmost utility on a large variety of machine tools. To attain the desired programmed operation of the three motors, a mechanico-hydraulic type power and control unit may be utilized. One type of such power and control unit is illustrated in the lower half of the drawing.

Briefly, such a unit ordinarily may comprise a main camshaft 150 having a plurality of rotary cams 152 keyed thereon, each cam having a contour composed of predetermined rise and fall ramps to produce a desired motion and impart it to a cam follower 154 during each complete revolution or cycle of the cam. Each cam follower 154 is connected by means of a piston rod 156 with a pulsator piston 158 reciprocable within a fixed transmitter or pulsator cylinder 160 to comprise a variable volume chamber. Such a unit comprises a pulse transmitter of the expansible chamber type to which one end of a liquid column 162 may be connected. The camshaft 150 drives a number of these pulsator sections designated *a*, *b* and *c* respectively. Each section may comprise units duplicating the typical single acting pulsator unit described immediately above.

Each of the motivator sections may include a balancing valve assembly which may be incorporated within the head of the cylinder 160. The balancing valve contains a replenishing check valve 164 and a spring-closed relief valve 166. All the replenishing and relief valves are connected to a common oil reservoir 168 which may be formed in the housing of the mechanico-hydraulic drive unit if desired. The reservoir 168 is preferably subjected to a low, superatmospheric pressure by a body of compressed air or other pressure maintaining arrangement. Check valves 164 allow flow from the reservoir 168 to the cylinder 160, while relief valves 166 allow flow oppositely when the cylinder pressure exceeds a certain value. Thus, each of the pairs of valves 164 and 166 may be referred to as a balancing valve which serves to balance the volume of liquid in each of the liquid column sections, as will be described.

The pulsator sections *a*, *b* and *c* are connected by closed liquid column lines with the work performing cylinders. The pulsator section *a* is connected by a closed liquid column 162*a* with the port 92 of the collet operating motor. Section *b* of the motivator is connected by a closed liquid column 162*b* with the port 46 of the double acting fluid motor arrangement for shifting the spindle to and fro axially within the housing 12. Pulsator section *c* is connected by closed liquid column 162*c* with the port 128 in the rear of the ejector bar operating motor.

In order to insure proper synchronization of the driving and driven elements of each pulsator section it is desirable to provide slightly more fluid displacement in the driving or transmitting elements 160 than is present in the respective fluid motors at the opposite end of the liquid column line. Thus, at the end of each advancing stroke of the transmitter piston 158, a small amount of fluid will be discharged to reservoir 168 through the relief valve 166. This amount plus any amount lost through leakage will be returned to the liquid column at the end of the return stroke by the operation of the replenishing valve 164.

Connected to the end of the fluid motors opposite the liquid column connections there are shown circles marked RO which designate the return oil connections by means of which a pulsator system may be hydraulically biased so as to maintain the follower in close contact with the cam as the falling portion of the cam contour recedes from the follower. This bias is maintained by a high pressure accumulator or oil reservoir, not shown, which may be provided with a manifold whereby both the RO connections are joined together and to the high pressure reservoir. The showing of separate return oil connections is indicative of any suitable type of biasing pressure source, whether it be single accumulator or multiplicity thereof. The contours of the individual cams 152 are likewise not illustrated in specific detail since they may be formed in accordance with the usual practice to cause motivation of each of the three fluid motors to operate the spindle in accordance with the particular operating cycle desired for the machine.

For turning the camshaft 150 a motor 170 drives an input shaft 172 of the two speed transmission through a belt drive 174. The input shaft 172 drives a pinion 176 and also the input member of a hydraulically-engaged, spring-released clutch 178. Pinion 176 drives a gear 180 secured to a countershaft 182 which carries a pinion 184 at the opposite end. Pinion 184 drives a gear 186 and therewith constitutes a set of change speed gears. Gear 186 drives the input member of a second hydraulically-engaged, spring-released clutch 188. The driven members of clutches 178 and 188 are secured to the opposite ends of a shaft 190 having a worm 192 thereon and a brake drum 194. The latter has a spring-biased hydraulic motor 196 for engaging the brake. Worm 192 drives a worm wheel 198 secured to the main camshaft 150.

For the purpose of automatically controlling the starting, stopping and speed of the transmission, there may be provided a hydraulic control pump 200 driven from gear 186, which may circulate a body of oil contained in the housing surrounding the transmission. The pump 200 may deliver to a combined accumulator and relief valve comprising a spring loaded piston 202 and also supplies oil to a bank of control valves 204, 206 and 208. In the diagrams, each valve is shown as a two-position valve, spring biased to the position illustrated in which the connections shown in the cross hatched rectangles are established. Single headed arrows are used to indicate flow at reservoir pressure and double headed arrows are used to indicate flow at pump delivery pressure. Each of the valves, when shifted, establishes the connections shown in the unhatched rectangles immediately below the hatched rectangles.

Valve 204 is arranged to be shifted by a solenoid 210. Valves 206 and 208 are arranged to be shifted by adjustable cams 212 and 214, respectively, which are positioned on the camshaft 150. In addition, the valve 206 has a hydraulic holding cylinder 216 which holds the valve 206 in its shifted position until it is released by the shifting of valve 208. Valve 204 in the position shown delivers pressure fluid to engage the brake 196 and also exhaust fluid to release the low speed clutch 188. When shifted, valve 204 exhausts fluid to release the brake 196 and supplies pressure fluid to engage the low speed clutch 188, subject, however, to a conjoint control by the valve 206.

The latter valve, in the position illustrated, exhausts fluid to release the high speed clutch 178 and places the low speed clutch 188 under the control of valve 204. In its shifted position valve 206, provided valve 204 has been shifted, delivers pressure fluid to engage high speed clutch 178 and exhausts fluid to release low speed clutch 188. As previously explained, the valve 208 is merely a reset valve for by-passing the holding cylinder 216 to permit valve 206 to return to its spring biased position shown in the drawings.

Thus, energization of solenoid 210 will start the camshaft 150 rotating at slow speed. Thereafter, the cam 212 will shift the transmission to drive the camshaft at high speed, and still later the cam 214 will again shift the transmission to slow speed. So long as the solenoid 210 remains energized, the camshaft 150 will continue to rotate, first at a slow speed then at a high speed during each revolution, controlling its own speed changes by operation of the cams 212 and 214.

For the purpose of controlling the drive motor 170 and solenoid 210, there is provided an electric control circuit connected between a pair of electric supply lines designated L1 and L2. The circuit may include a master relay 220 of the holding type having a manual master start switch 222 and a manual master stop switch 224. Relay 220 controls the motor 170 and also a cycle control relay 226 of the holding type having a manual cycle start switch 228, and a manual cycle stop switch 230. The normally opened contacts of relay 226, which are of the make-before-break type, control energization of cycle solenoid 210 directly. The normally closed contacts of relay 226 also control solenoid 210 but are in series with a cam switch 232 and arranged to be opened once during each revolution thereof. The arrangement is such that when the cycle stop switch 230 is operated at any point in the rotation of camshaft 150, relay 226 will be de-energized. The solenoid 210 will remain energized until cam switch 232 opens at the predetermined stopping point. Operation of the master stop switch 224, however, will de-energize solenoid 210 immediately, regardless of the point in the cycle, and will also de-energize the motor 170.

Obviously, the speed ratio between the high and low speeds of the camshaft 150, and the duration of the high speed portion of the cycle, may be selected as desired through use of the appropriate change gears 176—186 and through the adjustment of the cams 212 and 214, if desired. Of course, the two speed feature of the transmission may be omitted and the low speed clutch 188, the cams 212 and 214 and the valves 206 and 208 eliminated.

Thus, for each rotation of the camshaft 150, the spindle of this invention will be operated through a predetermined sequence of motions. Ordinarily, the low speed or feed portion of the cycle will be utilized during the actual work performing portion of the cycle of the machine upon which the spindle is incorporated. Then the high speed portion of camshaft rotation is utilized to quickly remove the finished work piece from the collet 52 and from the vicinity of the working portions of the machine, and to replace a new work piece in the collet.

In actual operation, when a typical machine has finished the work performing operation on the work piece gripped in the collet, the transmission will shift to high speed and the following operation will occur. First, the cam 152 at pulsator section b will present a falling face to its follower, allowing hydraulic medium to move back toward the pulsator from the cylinder chamber 22 through the port 46 under the constant bias of pressure in the annular cylinder chamber 24 admitted through port 48 from the source RO. With the constant source of pressure acting on the piston 28 and thus against the outer race of the bearing 40, the outer race will be shifted axially rearwardly of the housing 12 until the internal shoulder on the piston 26 abuts the cuff portion 20 of the sleeve 16, and thus pull the spindle 36 backward through a short stroke to remove the collet end of the spindle from the vicinity of the work performing portion of the machine. Then, cam 152 at pulsator section a will present a falling face to its follower to allow the piston 84 to shift forwardly under pressure admitted through port 94 from the source RO in a similar manner. This allows the rubber body portion 66 of the collet 52 to spring the radially disposed jaws 68 apart within the taper portion of the nose 50 of the spindle. As soon as the collet has opened sufficiently to release the work piece, the piston 112 will be shifted quickly forward under the timed control of pulsator section c against the biasing pressure RO admitted to the cylinder 114 through the port 124 to move the ejector plunger 110 forward through the collet and sweep the released work piece out of the collet.

As the plunger 110 finishes its forward ejecting stroke, the cam at pulsator section *c* of the motivator will present a falling face to its follower which allows the plunger 110 to be retracted under the biasing pressure from the source RO. As soon as the plunger 110 is back clear of the working portion of the collet 52, a new work piece may be loaded in the collet by suitable loading mechanism, not shown, on the machine. Whereupon, the cam 152 at pulsator section *a* will present a rising face to its follower to shift the piston 84 rearwardly in its cylinder 90 and draw the collet rearwardly against the tapered portions to securely clamp the work piece. At this point, the cam at pulsator section *b* will present a rising face to its follower to move the liquid column 162*b* which extends against the seal 30 of the annular piston 26 in a manner which shifts the spindle 36 forwardly in the housing 12. With the new work piece in the collet thus shifted forwardly, the transmission will again shift to slow, or feed speed for the duration of its revolution while work is being performed by the machine on the work piece. Obviously, other cams, not shown, on the camshaft 150 may be utilized for the other work performing piston and cylinder motors on the machine so that every operation of the machine may be timed in accordance with the rotation of the single camshaft. The spindle 36 may be rotated within its housing 12 by the belt 64 throughout the entire working portion of the cycle, that is continually, or it may be rotated only during the work performing portion of each machine cycle and idled during the work piece changeover portion of the cycle, as desired.

It will be appreciated that by simple adjustment of the expanded portion 102 of the sleeve 98, the draw bar 76 may be adjusted to fit various designs of collets in conjunction with various types of nose pieces which may be bolted to the front flanged portion of the spindle 36. Also, simple adjustment of the portion 132 of the ejector operating cylinder moves the plunger 110 in relation to either or both the collet and the spindle.

It will be appreciated that during the non-work performing portions of the machine cycle when the spindle is shifted rearwardly in the housing, the only axial load on the bearings 38 and 40 is that of the pressurized source RO. This source is high enough to maintain satisfactory axial stability of the spindle during work piece changing operations, yet is low enough so as not to cause undue amounts of wear on the bearings during this non-critical portion of the cycle. However, when the spindle 36 is shifted forwardly within the housing 12 by forward motion of the annular piston 26, the axial load on the bearings 38 and 40 is determined by the pressure setting of the spring-loaded relief valve 166 at the pulsator section *b*. This force may be adjustable and will be at least as high as the force required to overcome the inertia of the spindle 16 plus the return bias from the source RO acting oppositely against the annular piston 28. Thus, the high load on the bearings exists only during the critical work performing portion of the cycle when extreme stability of the collet is desired.

Thus, a spindle is provided which, when used in conjunction with a mechanico-hydraulic motivator such as disclosed, may be used on many types of machine tools to solve a large number of work piece supporting problems. The spindle is adjustable for many types of collets and sizes of work pieces. The constant fluid load of two different amounts on the spindle bearings insures accuracy as well as a long and useful life of the spindle.

While the above described embodiment constitutes a preferred mode of carrying out this invention, many other forms might be adopted within the scope of the actual invention, which is variously claimed as:

1. A high precision spindle assembly for machinery comprising in combination a stationary main housing member, an elongated spindle member rotatable within the housing member, an anti-friction bearing coaxial with the spindle member having an inner race and an outer race, one race axially fixed to one member and the other race slidably supported by the other member, the bearing supporting one end of the spindle member for rotation in the housing member, drive means connected to impart rotary motion to the spindle member, sleeve means in the other member forming therewith a cylinder chamber, a piston in the cylinder chamber positioned axially against the slidable race, a source of fluid pressure, means interconnecting the source and the chamber for biasing the piston to maintain an axial thrust on the other race, a second anti-friction bearing supporting the other end of the spindle member for rotation and limiting axial movement of the spindle member whereby both the first and second bearings are under a constant axial load.

2. A spindle assembly for rotatably supporting a work piece comprising a housing having a cylindrical bore adjacent each end thereof, a spindle in said housing, means between said housing and spindle forming a cylinder in each of said bores, a pair of bearings positioned one in each of said bores, said bearings each having an inner race fixed on said spindle and an outer race fixed axially relative to the inner race, said outer races slidably engaging said bores, said bearings supporting said spindle for rotation and axial sliding movement in said housing, a pair of opposed pistons in said cylinders, said pistons being adapted to engage the outer races of said bearings to shift said spindle axially in opposite directions in said housing and means for introducing fluid under pressure selectively to each of said cylinders.

3. A spindle assembly for rotatably supporting a work piece comprising a housing having an axial bore therein, a sleeve in said bore having an axially extending cuff spaced radially inwardly of said bore and cooperating therewith to form an annular cylinder extending circumferentially within said housing, a spindle supported within said sleeve for rotation and axial sliding movement, a piston in said cylinder operatively connected with said spindle and means for introducing fluid under pressure in said cylinder to actuate said piston and thereby shift said spindle axially within said housing.

4. The combination called for in claim 3 including a bearing having an inner race and an outer race, said inner race being fixed on said spindle and said outer race being fixed axially relative to said inner race and slidably engaging said bore, said piston being arranged when actuated to engage the outer race of said bearing to shift said spindle axially within said housing.

5. A spindle assembly for rotatably supporting a work piece comprising a housing having a cylindrical bore adjacent each end thereof, a spindle in said housing, means between said housing and spindle forming a cylinder in each of said bores, a pair of bearings positioned one in each of said bores, said bearings each having an inner race fixed on said spindle and an outer race fixed axially relative to the inner race, said outer races slidably engaging said bores, said bearings supporting said spindle for rotation and axial sliding movement in said housing, a pair of opposed pistons in said cylinders, said pistons being adapted to engage the outer races of said bearings to shift said spindle axially in opposite directions in said housing, means for introducing fluid under a particular pressure to one of the cylinders to bias the spindle in one axial direction and maintain a constant load on said pair of bearings, and means for selectively introducing fluid under pressure to the other of the cylinders at a pressure and over an area sufficient to axially shift said spindle in the other direction against the bias, thereby maintaining a constant load on said pair of bearings.

6. An automatic spindle assembly comprising in combination a housing having a cylindrical bore adjacent each end thereof, an elongated spindle extending through the housing, bearings in the bores supporting the spindle for rotary motion, an annular collet mounted in one end of the spindle to be operated between an opened and a closed position, an ejector plunger shiftable to and fro axially of the spindle within the collet, both the collet and the plunger being rotatable with the spindle, a pair of non-rotating cylinders axially aligned with the spindle, a piston reciprocable in each cylinder, an operating rod connected at one end to one piston and at the other end to the ejector plunger, the latter connection allowing relative rotary motion between the plunger and the rod, a tubular shaft surrounding the operating rod and connected at one end to the other piston and at the other end to the collet, the latter connection allowing relative rotary motion between the collet and the shaft, fluid pressure means connected to selectively shift each piston to and fro in its cylinder to open and close the collet and to operate the ejector plunger, drive means connected to rotate the spindle, and fluid pressure means maintaining a constant axial load on the spindle supporting bearings in the bores whereby the spindle and the housing are accurately positioned with respect to one another during collet actuation or plunger operation.

7. A spindle assembly for rotatably supporting a work piece comprising a housing, a spindle rotatably supported in said housing, a nose piece having a conically shaped inner face, said nose piece being mounted at one end of said spindle, a rubber collet in said nose piece having an outer surface corresponding in shape with the conical inner face of said nose piece, said collet having an axial bore for receiving a work piece and a plurality of radially and longitudinally extending vane-like jaws inset in the rubber, said collet, when moved axially in one direction in said nose piece, being contracted by the nose piece into engagement with the work piece in said collet and when shifted axially in the opposite direction, moving away from the conical surface of said nose piece to expand out of engagement with the work piece, a plurality of draw pins extending longitudinally through said collet, a pull ring locking said pins against axial movement in relation to said collet, a drawbar connected at one end thereof to said pins and means for shifting said drawbar axially to contract and expand the collet.

8. The combination called for in claim 7 wherein said drawbar is supported to rotate with said spindle, said means for shifting said drawbar including a shaft extending axially from the opposite end of said drawbar, a bearing connecting said shaft and said drawbar for relative rotation in axially fixed relation.

References Cited in the file of this patent

UNITED STATES PATENTS

| | | |
|---|---|---|
| 1,255,962 | Warner et al. | Feb. 12, 1918 |
| 2,058,731 | Sherriff | Oct. 27, 1936 |
| 2,403,136 | Stoner | July 2, 1946 |
| 2,648,175 | Fraser | Aug. 11, 1953 |
| 2,775,073 | Ingersoll et al. | Dec. 25, 1956 |

FOREIGN PATENTS

| | | |
|---|---|---|
| 186,947 | Austria | Sept. 25, 1956 |